US012445779B2

(12) United States Patent
Khonsaripour

(10) Patent No.: US 12,445,779 B2
(45) Date of Patent: Oct. 14, 2025

(54) TECHNIQUES FOR AUDIO TRACK ANALYSIS TO SUPPORT AUDIO PERSONALIZATION

(71) Applicant: HARMAN INTERNATIONAL INDUSTRIES, INCORPORATED, Stamford, CT (US)

(72) Inventor: Omid Khonsaripour, Thousand Oaks, CA (US)

(73) Assignee: Harman International Industries, Incorporated, Stamford, CT (US)

(*) Notice: Subject to any disclaimer, the term of this patent is extended or adjusted under 35 U.S.C. 154(b) by 0 days.

(21) Appl. No.: 18/658,737

(22) Filed: May 8, 2024

(65) Prior Publication Data

US 2024/0314499 A1    Sep. 19, 2024

Related U.S. Application Data

(63) Continuation of application No. 16/889,535, filed on Jun. 1, 2020, now Pat. No. 12,010,495.

(51) Int. Cl.
*H04R 5/04* (2006.01)
*G06F 16/635* (2019.01)
*G06F 16/68* (2019.01)
*G10L 15/22* (2006.01)

(52) U.S. Cl.
CPC ............. *H04R 5/04* (2013.01); *G06F 16/637* (2019.01); *G06F 16/68* (2019.01); *G10L 15/22* (2013.01); *G10L 2015/223* (2013.01)

(58) Field of Classification Search
CPC ......... H04R 5/04; G06F 16/637; G06F 16/68; G10L 15/22; G10L 2015/223
See application file for complete search history.

(56) References Cited

U.S. PATENT DOCUMENTS

| | | | |
|---|---|---|---|
| 7,826,911 B1 | 11/2010 | Bennett | |
| 9,111,519 B1 | 8/2015 | Yang et al. | |
| 9,606,766 B2 * | 3/2017 | Chakra | G06F 3/165 |
| 2007/0261537 A1 | 11/2007 | Eronen et al. | |
| 2008/0168390 A1 | 7/2008 | Benyamin | |
| 2010/0229094 A1 | 9/2010 | Nakajima et al. | |

(Continued)

FOREIGN PATENT DOCUMENTS

| | | |
|---|---|---|
| CN | 107615651 A | 1/2018 |
| CN | 109147807 A | 1/2019 |

(Continued)

OTHER PUBLICATIONS

Bergstra et al., "Aggregate Features and ADABOOST for Music Classification", Machine Learning, vol. 65, No. 2-3, XP019452363, DOI: 10.1007/S10994-006-9019-7, Jun. 30, 2006, pp. 473-484.

*Primary Examiner* — Daniel R Sellers
(74) *Attorney, Agent, or Firm* — Artegis Law Group, LLP

(57) ABSTRACT

Techniques for enabling personalization of audio tracks include selecting a portion of an audio track that is representative of the audio category, creating an audio sample from the portion of the audio track, playing the audio sample for a user, and adjusting, based on an input from the user while the audio sample is playing, a personalization setting for the user to be used when playing back audio from the audio category.

19 Claims, 4 Drawing Sheets

(56) References Cited

U.S. PATENT DOCUMENTS

| | | | |
|---|---|---|---|
| 2011/0035705 A1* | 2/2011 | Faenger | G06F 16/4387 |
| | | | 715/810 |
| 2012/0128173 A1 | 5/2012 | Whikehart et al. | |
| 2013/0340594 A1 | 12/2013 | Uemura et al. | |
| 2014/0003623 A1 | 1/2014 | Lang | |
| 2015/0081064 A1 | 3/2015 | Ball et al. | |
| 2015/0195663 A1 | 7/2015 | Lin et al. | |
| 2016/0342594 A1* | 11/2016 | Jehan | G06F 16/63 |
| 2017/0366865 A1 | 12/2017 | Hanes | |
| 2020/0050421 A1 | 2/2020 | Lang | |
| 2020/0136580 A1* | 4/2020 | Renner | H04N 21/4852 |
| 2020/0177146 A1 | 6/2020 | Mohapatra et al. | |
| 2021/0195328 A1* | 6/2021 | Welti | H03G 5/005 |

FOREIGN PATENT DOCUMENTS

| | | | |
|---|---|---|---|
| CN | 110347864 A | 10/2019 | |
| JP | 2006-508390 A | 3/2006 | |
| JP | 2011-145860 A | 7/2011 | |
| KR | 10-2005-0091762 A | 9/2005 | |
| WO | 2004/049188 A1 | 6/2004 | |

* cited by examiner

TECHNIQUES FOR AUDIO TRACK ANALYSIS TO SUPPORT AUDIO PERSONALIZATION

CROSS-REFERENCE TO RELATED APPLICATIONS

This application is a continuation of U.S. patent application titled "Techniques for Audio Track Analysis to Support Audio Personalization," filed Jun. 1, 2020, and having Ser. No. 16/889,535. The subject matter of this related application is hereby incorporated by reference.

BACKGROUND

Field of the Various Embodiments

Embodiments of the present disclosure relate generally to audio devices and, more specifically, to audio-track analysis to support audio personalization.

Description of the Related Art

Personal entertainment devices may include mobile applications and computer software that allow users to personalize electronic media and audio content. Such applications can allow users, for instance, to select and listen to preferred content or to adjust settings in order to enhance a user experience while listening to audio content such as music, videos, video games, online advertisements, and/or the like. Such applications can also allow users to digitally manipulate the audio content in order to enhance or clarify certain audio qualities.

However, in order to achieve a desired audio experience for a given audio content, a user typically manually adjusts various applications and/or settings, which can be a tedious, time consuming, and/or laborious. For instance, a user may need to raise or lower bass or treble levels, adjust frequency band filters, and/or apply compression or equalization based on personal preferences in order to better hear nuances or artifacts in an audio track and/or to achieve other desired goals.

Additionally, a user may find it difficult to personalize the application settings when switching between different categories of audio content. In particular, audio properties may vary based on the audio category. For example, audio personalization settings that are specific to a first audio category (e.g., rock and roll) may not be suitable for audio content from a second audio category (e.g., classical). Consequently, when the audio personalization settings for the first audio category are applied to audio content from the second audio category, the audio personalization settings could be poorly matched to the audio content from the second audio category, resulting in a poor listening experience for the audio content from the second audio category. Thus, a user may adjust the audio personalization settings whenever a switch between categories occurs. This often creates difficulty in consistently achieving a desired listening experience, especially when streaming audio content. Some of these personalization issues can be addressed by storing personalization settings for a user for each audio category. The personalization settings for the user can then be loaded and applied whenever an audio track from a corresponding audio category is played back to the user.

However, selecting an audio sample that is representative of a specific audio category by which to initially configure the personalization settings for that specific audio category is difficult. For example, a user may be familiar with a substantial number of audio content within the specific audio category but may not be able to easily determine a specific audio track to select as a representative sample for creating their personalized settings. Additionally, the audio properties typically vary within a piece of audio content, so that even when a specific audio track is representative of the specific audio category, not all portions of the specific audio track may be suitable for configuring the personalization settings for the specific audio category.

As a result, a user typically undergoes a tedious, time consuming, and error prone personalization process, with a high likelihood of selecting a poor representative sample by which to configure the personalization settings that often results in suboptimal personalization settings and a poor listening experience for many pieces of audio content from each audio category.

Accordingly, there is a need for techniques that enable users to better select audio samples for use when configuring personalization settings for different categories of sound content.

SUMMARY

The various embodiments set forth a computer-implemented method for determining audio personalization settings for an audio category. The method includes determining one or more audio properties of an audio track, selecting, based on the one or more audio properties, a first portion of the audio track that is representative of the audio category, playing the first portion of the audio track for a user, and adjusting, based on input from the user, a personalization setting for the user when playing back the first portion of the audio track.

Further embodiments provide, among other things, a system and one or more computer-readable storage media configured to implement the method set forth above.

At least one technical advantage of the disclosed techniques relative to the prior art is that the disclosed techniques enable improved audio personalization by allowing a user to more efficiently and effectively select a representative audio track and a representative audio sample from the representative audio track that contains the right balance of audio characteristics that would allow the user to achieve their preferred personalization settings for the specific audio category. Disclosed techniques may suggest, based on a selection by a user, a different representative audio track for use in creating personalized settings for a specific audio category. Additionally, the disclosed techniques provide users with a faster and computationally efficient means for generating a portion of the audio track that contains a category-specific balance of audio characteristics that can be used to configure personalization settings.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
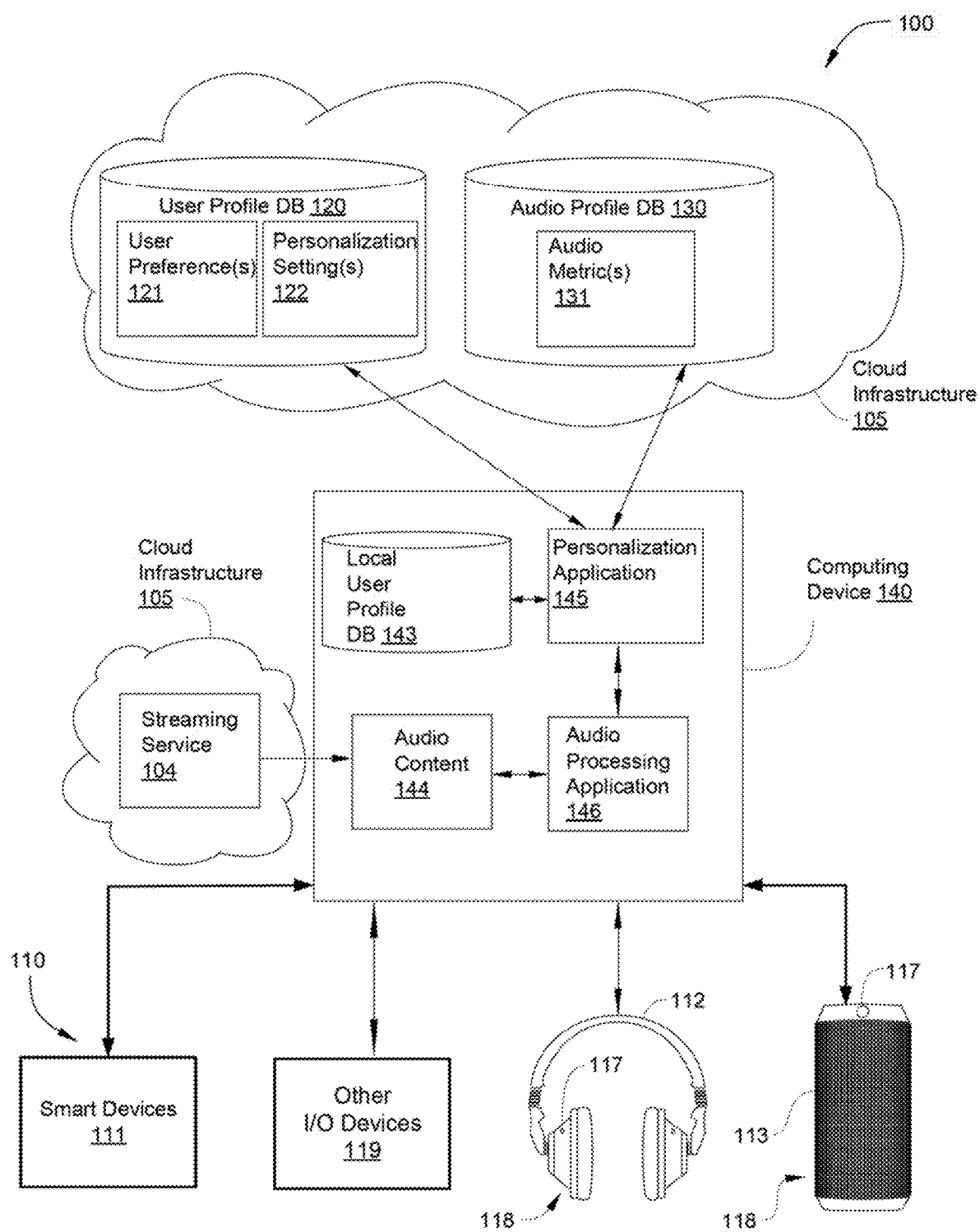
FIG. 1 is a schematic diagram illustrating an audio personalization system, configured to implement one or more aspects of the present disclosure.

FIG. 1 is a schematic diagram illustrating an audio personalization system 100, configured to implement one or more aspects of the present disclosure. Audio personalization system 100 includes, without limitation, one or more audio environments 110, a user profile database 120, an audio profile database 130, and a computing device 140. Audio personalization system 100 is configured to allow a user to more efficiently and effectively select a representative audio track and a representative audio sample from the representative audio track that would allow the user to achieve their preferred personalization settings for a corresponding audio category. In some embodiments, audio personalization system 100 is configured to allow a user to customize personalization settings for a plurality of audio categories.

In some embodiments, audio content for the audio experience is stored locally in computing device 140, and in other embodiments, such audio content is provided by a streaming service 104 that is implemented in a cloud-based infrastructure 105. Audio content may include music, videos, movies, video games, online advertisements, audio books, sounds (ringtones, animal sounds, synthesized sounds), pod casts, sporting events, or any other content that can be acoustically heard or recorded.

Cloud-based infrastructure 105 can be any technically feasible Internet-based computing system, such as a distributed computing system and/or a cloud-based storage system. In some embodiments, cloud-based infrastructure 105 includes, without limitation, a plurality of networks, a plurality of servers, a plurality of operating systems, a plurality of storage devices, and/or the like. The server may be a standalone server, a cluster or "farm" of servers, one or more network appliances, or any other device suitable for implementing one or more aspects of the present disclosure.

Each of the one or more audio environments 110 is configured to play audio content for a particular user. For example, audio environments 110 may include, without limitation, one or more smart devices 111, a headphone 112, a smart speaker 113, and/or other input/output (I/O) devices 119.

In the embodiments illustrated in FIG. 1, audio environments 110 play audio content received from computing device 140 via any technically feasible combination of wireless or wired point-to-point or networked communications links. Networked communications links include any suitable communications links to enable communications among remote or local computer systems and computing devices, including, without limitation, Bluetooth communications channels, wireless and wired LANs (Local Area Networks), Internet-based WANs (Wide Area Networks), cellular networks, and/or the like. As a result, audio environments 110 can include any audio device that can receive audio content from computing device 140 directly, such as a "dumb" speaker in a home, a stereo system in a vehicle, a conventional pair of headphones, and/or the like. Further, in the embodiment illustrated in FIG. 1, audio environments 110 do not rely on the ability to perform audio signal processing internally or to receive audio content or other information from entities implemented in cloud-based infrastructure 105.

Smart devices 111 can include, without limitation, a computing device that may be a personal computer, personal digital assistant, tablet computer, mobile phone, smart phone, media player, mobile device, or any other device suitable for implementing one or more aspects of the present invention. Smart devices 111 can augment the functionality of audio personalization system 100 by providing various services, including, without limitation, telephone services, navigation services, infotainment services, and/or the like. Further, smart devices 111 can acquire data from sensors and transmit the data to audio personalization system 100. Smart devices 111 can acquire sound data via an audio input device and transmits the sound data to audio personalization system 100 for processing. Likewise, smart devices 111 can receive sound data from audio personalization system 100 and transmit the sound data to an audio output device so that the user can hear audio originating from audio personalization system 100.

Headphone 112 can include an audio output device that can generate sound based on one or more audio signals received from audio personalization system 100 and/or an alternative audio device, such as a power amplifier associated with audio personalization system 100. More specifically, the audio output device can convert one or more electrical signals into sound waves and direct the sound waves into the physical environment.

Smart speaker 113 can include an audio input device that can acquire acoustic data, such as the voice of a user, from the surrounding environment and transmit signals associated with the acoustic data to audio personalization system 100.

Each of headphone 112 and smart speaker 113 includes one or more speakers 117, and, in some embodiments, one or more sensors 118. Speaker(s) 117 are audio output devices configured to produce sound output based on a customized audio signal received from computing device 140. Sensors(s) 118 are configured to acquire biometric data from the user (e.g., heartrate, skin conductance, and/or the like) and transmit signals associated with the biometric data to computing device 140. The biometric data acquired by sensor(s) 118 can then be processed by a personalization application 145 running on computing device 140 to determine one or more personal audio preferences of a particular user. In various embodiments, sensor(s) 118 may include any type of image sensor, electrical sensor, biometric sensor, and/or the like, that is capable of acquiring biometric data including, for example and without limitation, a camera, an electrode, a microphone, and/or the like.

Other I/O devices 119 include, without limitation, input devices, output devices, and devices capable of both receiving input data and generating output data. Other I/O devices 119 can include, without limitation, wired and/or wireless communication devices that send data to and/or receive data from smart devices 111, headphone 112, smart speaker 113, speakers 117, sensor(s) 118, remote databases, other computing devices, and/or the like. Additionally, in some embodiments, other I/O devices 119 may include a push-to-talk (PTT) button, such as a PTT button included in a vehicle, on a mobile device, on a smart speaker, and/or the like.

User profile database 120 stores user-specific information that enables a personalized audio experience to be produced in any of audio environment 110 for a particular user. As shown, user profile database 120 can be implemented in cloud-based infrastructure 105, and therefore can be accessed by computing device 140 whenever computing device 140 has access to a networked communication link. In some embodiments, information that is associated with a particular user and stored in user profile database 120 is also stored locally in computing device 140 that is associated with that particular user. In such embodiments, user preference profile(s) 121 and/or personalization setting(s) 122 are stored in a local user profile database 143 of computing device 140. The user-specific stored in user profile database 120 can include one or more of user preference profile(s) 121 and personalization setting(s) 122.

User preference profile(s) 121 can include user specific information that is employed to produce a personalized audio experience for a particular user. In some embodiments, user preference profile(s) 121 include acoustic filters and/or EQ curves that are associated with the particular user. In some embodiments, user preference profile(s) 121 include other user-preferred signal processing, such as dynamic range compression, dynamic expansion, audio limiting, spatial processing of an audio signal, and/or the like. In some embodiments, user preference profile(s) 121 can include a preset EQ curve selected during setup of preferred listening settings by the user. The EQ curve can include one or more discrete amplitude adjustments performed by the user during setup of preferred listening settings by the user. The preset EQ curve can be associated with a different user, such a well-known musician or celebrity. In some embodiments, the EQ curve can include head-related transfer function (HRTF) information specific to the particular user.

Personalization setting(s) 122 can include information employed to produce a personalized audio experience for a particular user during playback of a corresponding audio category. In some embodiments, each personalization setting 122 can be generated based settings set by a user during playback of an audio track with one or more audio properties representative of a particular audio category. In some embodiments, each personalization setting 122 can be determined from user input received during playback of a portion of an audio track, where the portion of the audio track has one or more audio properties representative of a particular audio category.

In some embodiments, each particular audio category can include any classification of musical or non-musical audio content. For example, an audio category can include music genres (classical, country, hip-hop, rock, and/or the like). The audio category can also include any classification of videos, movies, video games, online advertisements, audio books, sounds (ringtones, animal sounds, synthesized sounds), pod casts, sporting events, or any other content that can be acoustically heard or recorded. In some embodiments, each particular audio category can include any classification based on a combination of attributes such as rhythm, harmony, instrument, tonality, tempo, and/or the like.

In some embodiments, audio content selected by a particular user and played back in one of audio environments 110 is modified to suit the personal listening preferences of that user during playback of an audio track from a corresponding audio category. Alternatively or additionally, in some embodiments, personalization setting(s) 122 include other user-preferred and category-specific signal processing to be applied during playback of a corresponding audio category, such as category-specific dynamic range compression, category-specific dynamic expansion, category-specific audio limiting, category-specific spatial processing of an audio signal, and/or the like. In some embodiments, such category-specific signal processing can also be employed by audio processing application 146 to modify audio content when played back by the user in one of audio environments 110.

Computing device 140 can be any computing device that can be configured to implement at least one aspect of the present disclosure described herein, including a smartphone, an electronic tablet, a laptop computer, personal computer, personal digital assistant, mobile device, or any other device suitable for implementing one or more aspects of the present disclosure. Generally, computing device 140 can be any type of device capable of executing application programs including, without limitation, instructions associated with personalization application 145 and/or audio processing application 146. In some embodiments, computing device 140 is further configured to store local user profile database 143, which can include one or more of user preference profile(s) 121 and/or personalization setting(s) 122. In some embodiments, computing device 140 is further configured to store audio content 144, such as digital recordings of audio content.

Personalization application 145 is configured to perform communications between computing device 140 and user profile database 120, audio profile database 130, and audio environments 110. In some embodiments, personalization application 145 is also configured to present a user interface (not shown) to a user to enable a user sound preference test, a setup operation, and/or the like during playback of an audio track from a corresponding audio category. In some embodiments, personalization application 145 is further configured to generate a customized audio personalization procedure for an audio signal based on user-specific audio processing information and category-specific audio processing information.

Audio processing application 146 may dynamically generate a customized audio signal by processing an initial audio signal with the customized audio personalization procedure generated by personalization application 145. For instance, audio processing application 146 can generate the customized audio signal by modifying the initial audio signal based on the one or more applicable user personalization settings 122 associated with playback of a particular audio category.

Audio profile database 130 stores one or more audio metrics 131 for each of a plurality of categories of audio content. Each of the audio metrics 131 associated with a particular audio category is representative of audio samples that fall within the particular audio category. These one or more audio metrics 131 are usable by personalization application 145 to help select representative audio tracks and/or audio samples that are used to set the personalization settings 122 for corresponding audio categories. As shown, audio profile database 130 can be implemented in cloud-based infrastructure 105, and therefore can be accessed by computing device 140 whenever computing device 140 has access to a networked communication link. Audio profile database 130 may store information such as audio metrics 131.

In some embodiments, audio metrics 131 can be generated based on an analysis of audio content representative of each of the audio categories. In some embodiments, audio metrics 131 can include data associated with one or more audio properties such as dynamic properties, bass or treble levels, frequency spectra, energy, tempo, and/or the like.

In some embodiments, the audio samples used to determine audio metrics 131 for each of the audio categories may be selected from a curated collection of audio samples whose audio category has been pre-labeled and/or classified. In some embodiments, the one or more audio categories can be determined using an algorithm that determines one or more boundaries between various audio properties of the audio samples that are consistent with pre-labeling or classifications of the audio samples. In some embodiments, the one or more boundaries may be determined using a clustering technique (e.g., k-means cluster analysis), machine learning techniques, and/or the like.

In some embodiments, audio metrics 131 are stored separately for each audio category. In some embodiments, audio metrics 131 can be generated based on statistical modeling, data mining, and/or other algorithmic analysis of the aggregate audio content. In some embodiments, audio metrics 131 can include one or more statistical properties such as mean values, standard deviation, range of values, median values, and/or the like of one or more audio properties of audio content for each of the audio categories. As a non-limiting example, audio metrics 131 can include a mean and a standard deviation of spectral energy in each of a series of pre-defined frequency bands that indicate, the typical amount of spectral energy in each of the pre-defined frequency bands for each of the audio categories. As another non-limiting example, audio metrics 131 can include a mean and a standard deviation of temporal separations between consecutive tempo pulse signals, energy flux, energy spikes, downbeat locations, and/or the like. In some embodiments, audio metrics 131 can include a mean and a standard deviation of a frequency of the tempo pulse signals, energy flux, energy spikes, downbeat locations, and/or the like. In some embodiments, audio metrics 131 can include a mean and a standard deviation of a number of the tempo pulse signals, energy flux, energy spikes, downbeat locations, and/or the like during a predetermined time period.

In some embodiments, audio metrics 131 can include a tolerance window associated with each audio category. The tolerance window can be a predetermined range of expected values for one or more audio properties of audio content for a corresponding audio category. In some embodiments, the tolerance window can include limits for deviation for one or more audio properties.

In some embodiments, audio metrics can include a relative or absolute weight or score to be assigned to each of the audio properties in the calculation of a composite or aggregate audio metric to be associated with how well an audio sample matches a corresponding audio category. In some embodiments, the aggregate audio metric can be associated with a balance of audio properties usable to configure preferred personalization settings for the corresponding audio category.

In some embodiments, audio metrics 131 can be used by personalization application 145 to aid a user in selecting a representative audio track and a representative audio sample to be used by the user to customize personalization settings 122 for an audio category. In some embodiments, the user can select a full length of the audio track, a portion of the audio track, or an aggregate of one or more portions of one or more audio tracks, and/or the like as a potential candidate audio track to use when setting personalization settings 122 for the user. In some embodiments, personalization application 145 compares the audio properties of the audio track against the audio metrics 131 of the audio category associated with the selected audio track. In some embodiments, the audio category for the selected audio track can be determined from classification data and/or other metadata (e.g., genre, subgenre, artist, title, and/or the like) associated with the selected audio track and/or identification of the audio category by the user. In some embodiments, personalization application 145 may perform a real-time lookup of the classification data and/or other metadata against one or more online databases in order to determine the associated audio category. In some embodiments, personalization application 145 may identify one or more instruments in the audio track and perform one or more audio pattern matching techniques to determine the corresponding audio category.

In some embodiments, personalization application 145 determines one or more audio properties of the selected audio track such as dynamic properties, bass or treble levels, frequency spectra, energy, tempo, and/or the like. In some embodiments, the energy of the audio track includes the amplitude (dB level) in various frequency sub-bands. In some embodiments, the frequency range of the audio track can be divided into frequency sub-bands. In some embodiments, the sub-bands are associated with predetermined frequency ranges. In some embodiments, sub-band coefficients corresponding to the spectral energy in each of the sub-bands can be determined using time-frequency domain transform techniques such as modified discrete cosine transform (MDCT), fast Fourier transform (FFT), quadrature mirror filter banks (QMF), conjugated quadrature mirror filter banks (CQMF), and/or the like.

In some embodiments, the tempo can be determined using bar line detection techniques such as impulse signal correlations with energy flux, finding repetitive energy spikes, downbeat locations, and/or the like. In some embodiments, the tempo can be determined as a mean duration between energy spikes, downbeat locations, and/or the like. In some embodiments, the tempo can be determined as a mean frequency of the energy spikes, downbeat locations, and/or the like. In some embodiments, the tempo can be determined as a count of a number of energy spikes, downbeat locations, and/or the like occurring during a predetermined time period. In some embodiments, personalization application 145 determines energy flux using techniques such as Short time Fourier transforms (STFT) and/or the like.

In some embodiments, personalization application 145 determines whether the selected audio track is representative of the corresponding audio category by comparing the audio properties of the selected audio track against one or more audio metrics 131 associated with the corresponding audio category. In some embodiments, personalization application 145 compares the audio properties of the audio track against a combination of one or more of the statistical properties and/or tolerance windows associated with the corresponding audio category.

In some embodiments, personalization application 145 determines whether all or a predetermined percentage (e.g., 90 percent, 80 percent, 75 percent, and/or the like) the audio properties of the selected audio track are within the corresponding ranges for each audio property in audio metrics 131. In some embodiments, the ranges are determined based on a predetermined number of standard deviations from the corresponding mean for each audio metric 131, the tolerance window for each audio metric 131, and/or the like.

In some embodiments, personalization application 145 determines whether an aggregate difference between the audio properties and the corresponding audio metrics 131 of the corresponding audio category is below a threshold difference. In some embodiments, the difference between an audio property and a corresponding audio metric 131 is based on how much the audio property differs from the mean for the corresponding audio metric 131. In some embodiments, the difference is measured by determining a z-score indicating how many standard deviations the audio property is from the mean of the corresponding audio metric. In some embodiments, the differences between the audio properties and the corresponding audio metrics 131 can be aggregated using a distance function (e.g., a Euclidean distance), a weighted sum, and/or the like. In some embodiments, the weights used in the weighted sum may correspond to a weight or score assigned to each audio property being indicative of the importance of the audio property relative to other to other audio properties in determining personalization settings associated with the corresponding category.

In some embodiments, when personalization application 145 determines that the one or more audio properties does not meet the one or more audio metrics, personalization application 145 can suggest an alternative audio track. In some embodiments, personalization application 145 selects an audio track from one or more of audio samples from the curated library of audio samples used for audio metrics 131, audio content playing via the streaming service 104, audio content 144, a web-based program, from a program stored locally on computing device 140, from a playlist, and/or the like. In some embodiments, personalization application 145 suggests an audio sample with audio properties similar to the audio properties of the corresponding audio category.

In some embodiments, personalization application 145 can dynamically generate a suggestion of an alternative audio track for the corresponding audio category. In some embodiments, personalization application 145 can suggest an audio track representative of the corresponding audio category based on analyzing the one or more of audio samples in the curated library of audio samples used for audio metrics 131. In some embodiments, personalization application 145 dynamically generates a suggestion of an alternative audio track by analyzing a plurality of audio tracks with audio properties similar to the audio properties of the corresponding audio category. In some embodiments, personalization application 145 uses an algorithm preconfigured to automatically select a different representative track based on a dynamic analysis of the one or more audio properties of one or more audio samples against the one or more audio metrics 131 of the corresponding audio category. In some embodiments, personalization application 145 can suggest a different audio track based on historical data on the selection of representative tracks by the user in a related audio category, data on representative audio tracks for the audio category, demographic data indicative of one or more representative tracks chosen by similar users, and/or the like.

In some embodiments, personalization application 145 compares audio properties of one or more portions of the audio track against the one or more audio metrics 131 to determine the portion of the audio track representative of the corresponding audio category. In some embodiments, personalization application 145 divides the selected audio track into one or more frames. In some embodiments, personalization application 145 compares the audio properties of one or more portions of the audio track against a combination of one or more of the statistical properties and/or tolerance windows associated with the corresponding audio category. In some embodiments, personalization application 145 determines the portion of the audio track most representative of the corresponding audio category using techniques similar to those described above with respect to determining whether the selected audio track is representative of the corresponding audio category.

In some embodiments, personalization application 145 creates an audio sample based on the portion of the audio track. In some embodiments, the audio sample can include a predefined length of audio content generated from the portion of the audio track. For instance, the audio sample may be a 15-25 second sample selected from the portion of the audio track. In some embodiments, personalization application 145 preselects the audio sample from the portion of audio track or creates the audio sample based on user input. In some embodiments, the audio sample is a repetitive loop generated from the portion of audio track. In some embodiments, the audio sample comprises multiple repetitions of the portion of the audio track.

In some embodiments, personalization application 145 creates the audio sample by seamlessly editing the repetitions of the portion of the audio track together into the audio sample. In some embodiments, personalization application shortens or lengthens a length of the portion of the audio track so that a discontinuity in tempo is not created between an end of a first repetition of the portion of the audio track and the start of a second repetition of the audio track. In some embodiments, the shortening or the lengthening is selected so that a time duration between a last tempo pulse signal, energy spike, downbeat location, and/or the like in the first repetition and a first tempo pulse signal, energy spike, downbeat location, and/or the like in the second repetition are consistent with an overall tempo for the portion of the audio track. In some embodiments, a similar technique can be used when multiple portions of the audio track are combined together to create the audio sample.

In some embodiments, personalization application 145 continuously plays back one or more specific sections of the audio sample based on a dynamic analysis of one or more audio properties of the audio sample. In some embodiments, the playback of the audio sample is based on comparing the audio properties of the audio sample against one or more audio metrics 131 associated with the corresponding audio category. In some embodiments, the playback of the audio sample redirects the user's focus to one or more specific sections of the audio sample that have the smallest aggregate difference to the one or more audio metrics 131 for the corresponding audio category.

In some embodiments, personalization application 145 can then adjust, based on user input, one or more personalization settings for a user when playing back the audio sample. In some embodiments, the user can raise or lower bass or treble levels, adjust frequency band filters, apply compression or equalization, perform discrete amplitude adjustments, select or modify preset acoustic filters, select preferred signal processing for the audio category (such as dynamic range compression, dynamic expansion, audio limiting, spatial processing of an audio signal) and/or the like. In some embodiments, the user can select historical personalization settings for a related audio category as a starting point and update the personalization settings during playback of the audio sample.

In some embodiments, personalization application 145 then saves the one or more personalization settings for the audio category. In some embodiments, the personalization settings are saved in personalization settings 122 in the user profile database 120.

In some embodiments, audio processing application 146 can apply the personalization settings to playback of an audio track. In some embodiments, the user can select a full length of the audio track, a portion of the audio track, or an aggregate of one or more portions of one or more audio tracks, and/or the like. In some embodiments, audio processing application 146 can determine an audio category of the audio track by using techniques similar to those described above with respect to personalization application 145. In some embodiments, audio processing application 146 determines the audio category for the selected audio track from classification data and/or other metadata associated with the selected audio track, from user input, and/or the like.

In some embodiments, audio processing application 146 determines whether personalization settings are available for the particular audio category. In some embodiments, if audio processing application 146 determines that personalization settings are not available for the particular audio category, audio processing application 146 provides an option for creating personalization settings using personalization application 145. In some embodiments, if audio processing application 146 determines that personalization settings are available for the audio category, audio processing application 146 loads personalization settings for the audio category. In some embodiments, audio processing application 146 loads personalization settings for the audio category from saved personalization settings 122 in the user profile database 120. In some embodiments, audio processing application 146 applies personalization settings to playback of the audio track.

Figure 2:
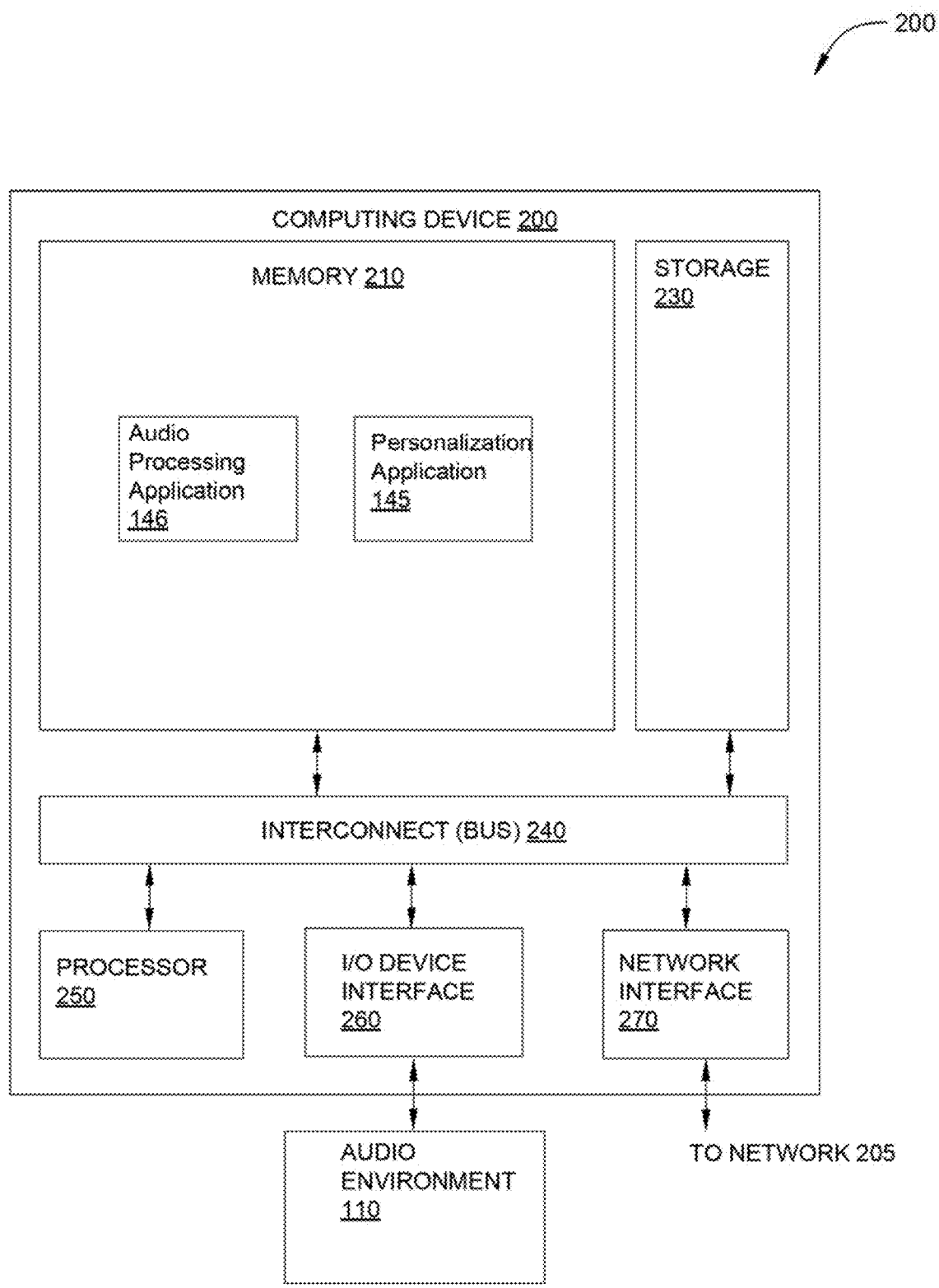
FIG. 2 is a conceptual block diagram of a computing system configured to implement one or more aspects of the various embodiments of the present disclosure.

FIG. 2 is a conceptual block diagram of a computing device 200 configured to implement one or more aspects of the various embodiments. In some embodiments, computing device 200 is consistent with computing device 140. Computing device 200 may be any type of device capable of executing application programs including, without limitation, instructions associated with personalization application 145, audio processing application 146, and/or the like. For example, and without limitation, computing device 200 may be an electronic tablet, a smartphone, a laptop computer, an infotainment system incorporated into a vehicle, a home entertainment system, and/or the like. Alternatively, computing device 200 may be implemented as a stand-alone chip, such as a microprocessor, or as part of a more comprehensive solution that is implemented as an application-specific integrated circuit (ASIC), a system-on-a-chip (SoC), and so forth. It is noted that the computing system described herein is illustrative and that any other technically feasible configurations fall within the scope of the present invention.

As shown, computing device 200 includes, without limitation, an interconnect (bus) 240 that connects a processor 250, an input/output (I/O) device interface 260 coupled to audio environment 110 of FIG. 1, memory 210, a storage 230, and a network interface 270. Processor 250 may be any suitable processor implemented as a central processing unit (CPU), an application-specific integrated circuit (ASIC), a field programmable gate array (FPGA), any other type of processing unit, or a combination of different processing units, such as a CPU configured to operate in conjunction with a digital signal processor (DSP). For example, in some embodiments, processor 250 includes a CPU and a DSP. In general, processor 250 may be any technically feasible hardware unit capable of processing data and/or executing instructions to facilitate operation of computing device 200, as described herein. Further, in the context of this disclosure, the computing elements shown in computing device 200 may correspond to a physical computing system (e.g., a system in a data center) or may be a virtual computing instance executing within a computing cloud.

I/O device interface 260 enables communication of audio environment 110 of FIG. 1 with processor 250. I/O device interface 260 generally includes the requisite logic for interpreting addresses corresponding to audio environment 110 that are generated by processor 250. I/O device interface 260 may also be configured to implement handshaking between processor 250 and audio environment 110, and/or generate interrupts associated with audio environment 110. I/O device interface 260 may be implemented as any technically feasible CPU, ASIC, FPGA, any other type of processing unit or device.

Network interface 270 is a computer hardware component that connects processor 250 to communication network 205. Network interface 270 may be implemented in computing device 200 as a stand-alone card, processor, or other hardware device. In some embodiments, network interface 270 may be configured with cellular communication capability, satellite telephone communication capability, a wireless WAN communication capability, or other types of communication capabilities that allow for communication with communication network 205 and other computing devices external to computing device 200.

Memory 210 may include a random access memory (RAM) module, a flash memory unit, or any other type of memory unit or combination thereof. Processor 250, I/O device interface 260, and network interface 270 are configured to read data from and write data to memory 210. Memory 210 includes various software programs that can be executed by processor 250 and application data associated with said software programs, including personalization application 145, audio processing application 146, and/or the like.

Storage 230 can include a non-transitory computer-readable medium, such as a non-volatile storage device. In some embodiments, storage 230 includes local user profile database 143.

Figure 3:
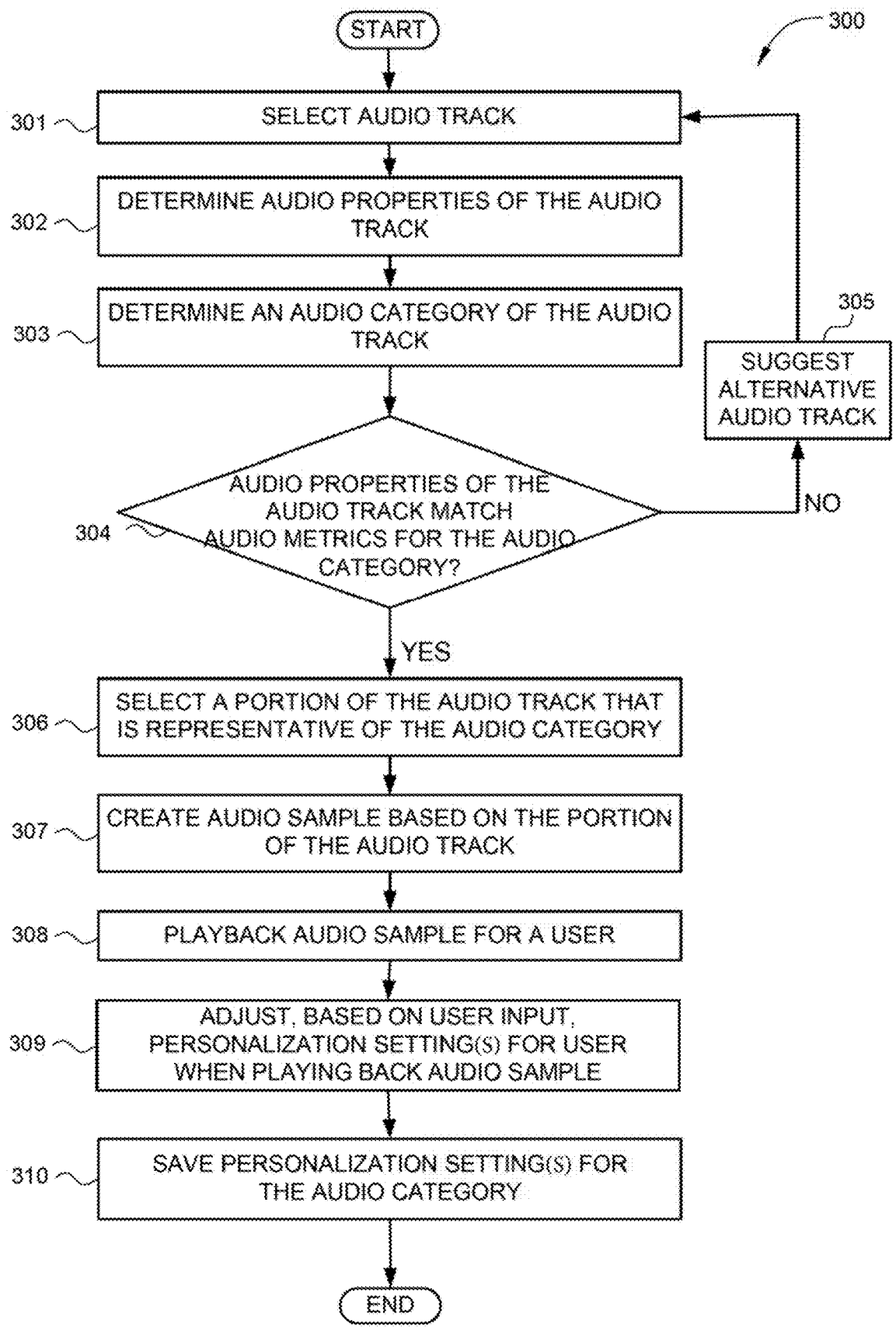
FIG. 3 is a flowchart of method steps for customizing personalization settings for an audio category, according to various embodiments of the present disclosure.

FIG. 3 is a flowchart of method steps for customizing personalization settings for an audio category, according to various embodiments of the present disclosure. Although the method steps are described with respect to the system of FIG. 1, a person skilled in the art will understand that any system configured to perform the method steps, in any order, falls within the scope of the various embodiments. In some embodiments, some or all of the steps of the method of FIG. 3 can be performed by personalization application 145.

As shown, method 300 begins at step 301, in which a user selects an audio track. In some embodiments, the user can select a full length of the audio track, a portion of the audio track, or an aggregate of one or more portions of one or more audio tracks, and/or the like. In some embodiments, the user can select an audio track from audio content playing via the streaming service 104 or from audio content 144 stored locally on computing device 140. In some embodiments, the user can select the audio track using a web-based program or a program stored locally on computing device 140. In some embodiments, the audio track may be selected automatically based on data acquired from sensor(s) 118 or sensors located on smart device(s) 111. For instance, the audio track can be selected based on the sensor capturing the user voicing a selection, motion and/or gesture by the user associated with the selection of an audio track, a user interaction with an input device, and/or the like. In some embodiments, the audio track may be selected from a playlist.

In step 302, audio properties of the audio track are determined. In some embodiments, one or more audio properties of the selected audio track a determined, such as dynamic properties, bass or treble levels, frequency spectra, energy, tempo, and/or the like. In some embodiments, the frequency range of the audio track can be divided into frequency sub-bands. In some embodiments, frequency domain techniques, similar to those described above with respect to personalization application 145 in FIG. 1, are used to determine sub-band coefficients corresponding to the spectral energy in each of the sub-bands.

In step 303, an audio category of the audio track is determined. In some embodiments, the audio category for the selected audio track can be determined from classification data and/or other metadata associated with the selected audio track. In some embodiments, the audio category for the selected audio track can be determined by performing a real-time lookup of the classification data and/or other metadata against one or more online databases. In some embodiments, the audio category for the selected audio track can be determined by identifying one or more instruments in the audio track and performing one or more audio pattern matching techniques.

In some embodiments, the audio category is determined based on user selection. In some embodiments, the audio category may be selected automatically based on data acquired from sensor(s) 118 or sensors located on smart device(s) 111. For example, the audio category can be selected based on sensor(s) 118 capturing a voice command identifying an audio category selection, motion and/or a gesture by the user identifying the selection of an audio category, a user interaction with an input device, and/or the like.

In step 304, the audio properties of the audio track are compared to one or more audio metrics 131 for the audio category to determine whether the selected audio track is representative of the corresponding audio category. In some embodiments, the audio properties of the audio track are compared against a combination of one or more of the statistical properties and/or tolerance windows associated with the corresponding audio category.

In some embodiments, the audio properties of the audio track are compared with the ranges or mean for the corresponding audio metrics 131 to determine what percentage of the audio properties are within the corresponding ranges, within a predetermined number of standard deviations from the corresponding mean, within the tolerance window the corresponding audio metrics 131, and/or the like. In some embodiments, an aggregate difference between the audio properties of the audio track and the corresponding audio metrics 131 is compared to a threshold difference. In some embodiments, the aggregate difference is based on a distance function (e.g., a Euclidean distance), a weighted sum, and/or the like. In some embodiments, the difference between the audio properties and the corresponding audio metrics 131 is measured from the mean for the corresponding audio metric 131 or measured by determining a z-score indicating how many standard deviations the audio property is from the mean of the corresponding audio metric.

When the audio properties are not consistent with the audio metrics 131 for the corresponding audio category (e.g., too many of the audio properties are outside of the corresponding ranges and/or the aggregate distance is above the threshold distance), then an alternative audio track is suggested in step 305. When the audio properties are consistent with the audio metrics 131 for the audio category of the audio track, the selected audio track is further processed beginning with a step 306.

In step 305, an alternative audio track is suggested. In some embodiments, a different audio track is suggested based on historical data on selection by the user of representative tracks in a related audio category, data on representative audio tracks for the audio category, demographic data indicative of one or more representative tracks chosen by similar users, and/or the like. Steps 301-304 are then repeated to allow the user to select another audio track to determine whether the another audio track is consistent with the audio category.

In step 306, a portion of audio track that is representative of the audio category is selected. In some embodiments, the audio track is divided into one or more frames or segments. In some embodiments, techniques similar to those used in step 304 are used to determine which of the frames and/or segments has audio properties that are best representative of the audio category determined during step 303. The most representative frame or segment is then selected as the portion of the audio track. In some embodiments the frame and/or segment that has a smallest aggregate difference to the one or more audio metrics 131 for the audio category is selected as the portion of the audio track.

In step 307, an audio sample is created based on the portion of the audio track. In some embodiments, the audio sample can include a predefined length of audio content (e.g., a 15-25 second sample) generated from the portion of the audio track. In some embodiments, the audio sample is a repetitive loop generated from the portion of audio track. In some embodiments, the audio sample comprises multiple repetitions of the first portion of the first audio track. In some embodiments, the audio sample is created by seamlessly editing the repetitions of the portion of the audio track together into the audio sample so that a discontinuity in tempo is not created between any two repetitions of the first portion of the audio track.

In step 308, the audio sample is played back for the user. The audio sample can be played back using any of the devices in audio environment 110 including, without limitation, one or more smart devices 111, a headphone 112, a smart speaker 113, and other input/output (I/O) devices 119. In some embodiments, the audio sample can be played back automatically based on data acquired from sensor(s) 118 or sensors located on smart device(s) 111. For instance, the audio sample can be played back based on the sensor capturing the user voicing a playback command, motion and/or a gesture by the user associated with the initiation of playback of the audio sample, a user interaction with an input device, and/or the like.

In step 309, one or more personalization settings for a user is adjusted based on user input when playing back the audio sample. In some embodiments, the user can raise or lower bass or treble levels, adjust frequency band filters, apply compression or equalization, perform discrete amplitude adjustments, select or modify preset acoustic filters, select preferred signal processing for the audio category (such as dynamic range compression, dynamic expansion, audio limiting, spatial processing of an audio signal) and/or the like. In some embodiments, the user can select historical personalization settings for a related audio category as a starting point and update the personalization settings during playback of the audio sample.

In some embodiments, the personalization setting(s) are adjusted automatically based on data acquired from sensor(s) 118 or sensors located on smart device(s) 111. For instance, the personalization setting(s) can be adjusted based on the sensor capturing the user voicing a command to raise, lower, select, modify, or adjust the setting. In some embodiments, the personalization setting(s) can be adjusted based on the sensor capturing motion and/or a gesture by the user associated with adjustment of the setting, a user interaction with an input device, and/or the like.

In step 310, the personalization setting(s) for the audio category are saved. In some embodiments, the user can save the personalization setting(s) as new personalization setting(s) or update previously stored personalization setting(s) for one or more related categories of audio content. In some embodiments, the personalization setting(s) are associated with the audio category. In some embodiments, the personalization setting(s) can be saved automatically based on data acquired from sensor(s) 118 or sensors located on smart device(s) 111. For instance, the personalization setting(s) can be saved based on the sensor capturing the user voicing a save or update command, motion and/or a gesture by the user associated with the initiation of saving or updating personalization settings, a user interaction with an input device, and/or the like. In some embodiments, the personalization setting(s) are saved in personalization settings 122 in the user profile database 120.

Figure 4:
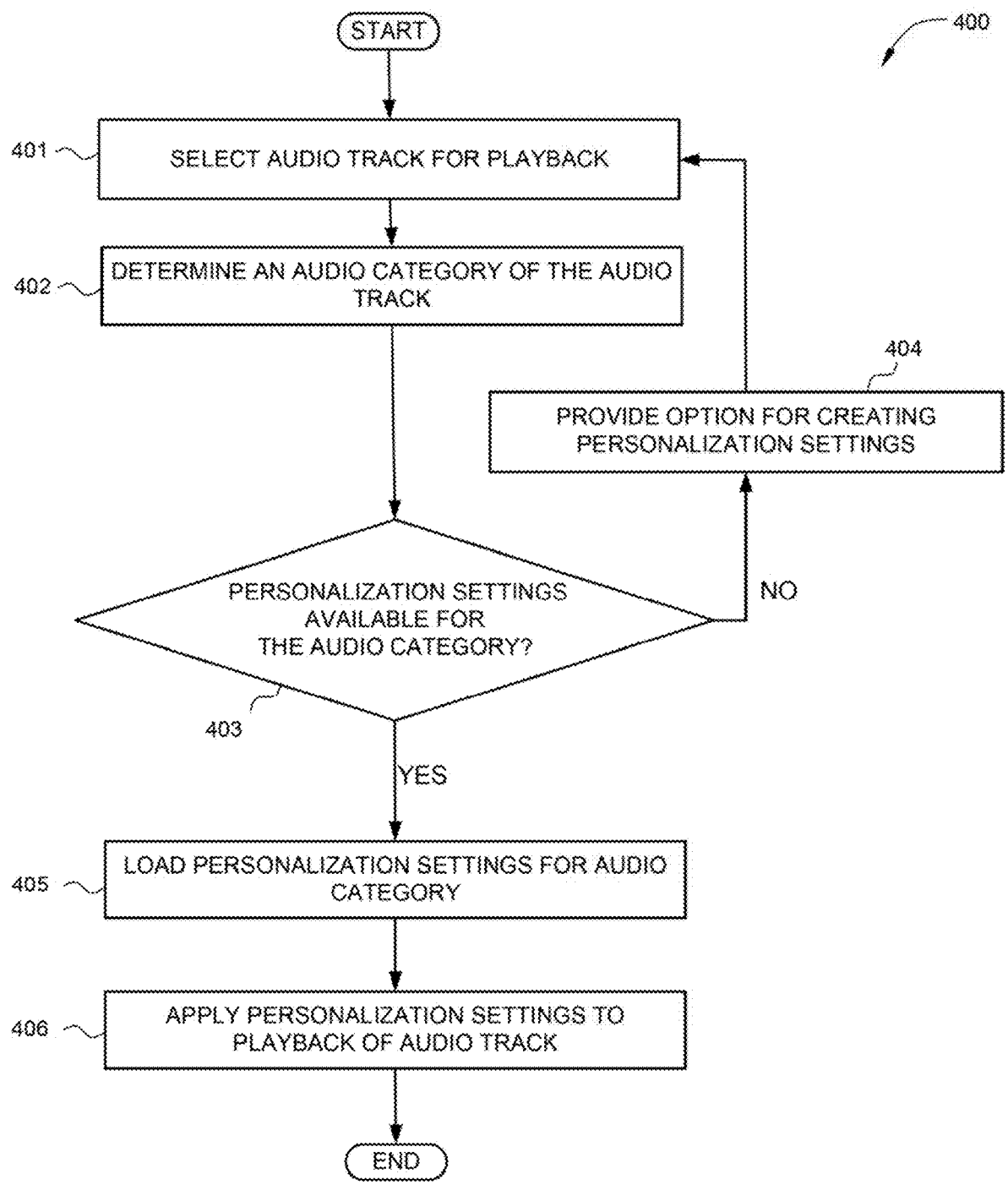
FIG. 4 is a flowchart of method steps for applying audio personalization settings to playback of an audio track, according to various embodiments of the present disclosure.

FIG. 4 is a flowchart of method steps for applying audio personalization settings to playback of an audio track. Although the method steps are described with respect to the system of FIG. 1, a person skilled in the art will understand that any system configured to perform the method steps, in any order, falls within the scope of the various embodiments. In some embodiments, some or all of the steps of the method of FIG. 3 may be performed by audio processing application 146.

As shown, method 400 begins at step 401, in which a user selects an audio track for playback. In some embodiments, the user can select a full length of the audio track, a portion of the audio track, or an aggregate of one or more portions of one or more audio tracks, and/or the like. The user may select an audio track from audio content playing via the streaming service 104 or from audio content 144 stored locally on computing device 140. The user can select the audio track using a web-based program or a program stored locally on computing device 140. The audio track may be selected automatically based on data acquired from sensor(s) 118 or sensors located on smart device(s) 111. For instance, the audio track can be selected based on the sensor capturing the user voicing a selection, motion and/or a gesture by the user associated with the selection of an audio track, a user interaction with an input device, and/or the like.

In step 402, an audio category of the audio track is determined. In some embodiments, the audio category for the selected audio track can be determined from classification data and/or other metadata associated with the selected audio track. In some embodiments, the audio category for the selected audio track can be determined by performing a real-time lookup of the classification data and/or other metadata against one or more online databases. In some embodiments, the audio category for the selected audio track can be determined by identifying one or more instruments in the audio track and performing one or more audio pattern matching techniques.

In some embodiments, the audio category is determined based on user selection. In some embodiments, the audio category may be selected automatically based on data acquired from sensor(s) 118 or sensors located on smart device(s) 111. For example, the audio category can be selected based on sensor(s) 118 capturing a voice command identifying an audio category selection, motion and/or a gesture by the user identifying the selection of an audio category, a user interaction with an input device, and/or the like.

In some embodiments, techniques similar to those used in step 304 are used to determine the audio category for the selected audio track. In some embodiments, the audio category is determined by comparing the audio properties of the selected audio track against one or more audio metrics 131 associated with one or more audio categories to find the audio category whose one or more audio metrics 131 best matches the audio properties of the selected track.

In step 403, a determination of whether personalization settings are available for the particular audio category is made. In some embodiments, the software application queries user profile database 120 to determine whether the stored personalization setting(s) 122 included personalization settings for the particular audio category. In some embodiments, when no personalization settings are found for the particular audio category, an option for creating personalization settings is provided in step 404. In some embodiments, when personalization settings are available for the particular audio category, the selected audio track is further processed beginning with a step 405.

In step 404, an option for creating personalization settings is provided. In some embodiments, suggested options for personalization settings for the particular audio category are generated, thereby allowing a user to select personalization settings for the audio category. In some embodiments, the user is given an option to select historical personalization settings for a related audio category and save the personalization settings for the particular audio category. In some embodiments, the user is given an option to initiate a process for customizing personalization settings for an audio category such as the method disclosed in FIG. 3.

In step 405, personalization settings for the audio category are loaded. In some embodiments, the personalization settings for the audio category correspond to the personalization settings saved during step 310.

In step 406, personalization settings are applied to playback of the audio track. In some embodiments, a customized audio signal is generated by modifying the audio from the audio track selected during step 401 according to the personalization settings loaded during step 405.

In sum, various embodiments set forth systems and techniques for enabling audio personalization by providing an efficient and expedient means for selecting a representative audio track and a representative audio sample. In the disclosed embodiments, the software application determines whether an audio track is representative of a corresponding audio category by analyzing the audio track to determine its audio properties and comparing the audio properties of the audio track against one or more audio metrics associated with the corresponding audio category. When the audio track is sufficiently representative of the corresponding audio category, the software application compares audio properties of one or more portions of the audio track against one or more audio metrics to determine the portion of the audio track representative of the corresponding audio category. The software application then creates an audio sample based on the portion of the audio track. In some embodiments, the software application can then adjust, based on user input, one or more personalization settings for a user when playing back the audio sample. In some embodiments, one or more personalization settings can be applied to playback of an audio track from the corresponding audio category.

At least one technical advantage of the disclosed techniques relative to the prior art is that the disclosed techniques enable improved audio personalization by allowing a user to more efficiently and effectively select a representative audio track that contains the right balance of audio properties that would allow the user to achieve their preferred personalization settings for the specific audio category. Disclosed techniques may suggest, based on a selection by a user, a different representative audio track for use in creating personalized settings for a specific audio category. Additionally, the disclosed techniques provide users with a faster and computationally efficient means for generating a portion of the audio track that contains a category-specific balance of audio characteristics that can be used to configure personalization settings.

1. In some embodiments, a computer-implemented method for determining audio personalization settings for an audio category comprises: determining one or more audio properties of an audio track; selecting, based on the one or more audio properties, a first portion of the audio track that is representative of the audio category; playing the first portion of the audio track for a user; and adjusting, based on input from the user, a personalization setting for the user when playing back the first portion of the audio track.

2. The computer-implemented method of clause 1, further comprising: creating an audio sample comprising multiple repetitions of the first portion of the audio track, wherein playing the first portion of the audio track further comprises playing the audio sample.

3. The computer-implemented method of clauses 1 or 2, wherein creating the audio sample comprises shortening or lengthening a duration of the first portion of the audio track to avoid creating a discontinuity in tempo between the repetitions of the first portion of the audio track in the audio sample.

4. The computer-implemented method of any of clauses 1-3, further comprising determining, prior to selecting the first portion of the audio track and based on the one or more audio properties, whether the audio track is representative of the audio category.

5. The computer-implemented method of any of clauses 1-4, further comprising suggesting, based on the determination, a second audio track that is representative of the audio category.

6. The computer-implemented method of any of clauses 1-5, wherein the one or more audio properties comprise at least one of bass levels, treble levels, frequency spectra, energy, or tempo.

7. The computer-implemented method of any of clauses 1-6, wherein selecting the first portion of the audio track comprises comparing each of the one or more audio properties with a corresponding audio metric associated with the audio category.

8. The computer-implemented method of any of clauses 1-7, wherein selecting the first portion of the audio track comprises determining whether an aggregate difference between each of the one or more audio properties and a corresponding audio metric associated with the audio category is below a threshold difference.

9. The computer-implemented method of any of clauses 1-8, wherein selecting the first portion of the audio track comprises comparing each of the one or more audio properties with a range for a corresponding audio metric associated with the audio category.

10. The computer-implemented method of any of clauses 1-9, further comprising determining the audio category for the audio track based on metadata associated with the audio track or a user selection.

11. In some embodiments, a system, comprises: a memory storing one or more software applications; and a processor that, when executing the one or more software applications, is configured to perform steps of: determining one or more audio properties of an audio track; selecting, based on the one or more audio properties, a first portion of the audio track that is representative of an audio category; playing the first portion of the audio track for a user; and adjusting, based on input from the user, a personalization setting for the user when playing back the first portion of the audio track.

12. The system of clause 11, wherein the processor is further configured to perform the steps of determining, prior to selecting the first portion of the audio track and based on the one or more audio properties, whether the audio track is representative of the audio category.

13. The system of clauses 11 or 12, wherein the processor is further configured to perform the steps of suggesting, based on the determination, a second audio track that is representative of the audio category.

14. The system of any of clauses 11-13, wherein selecting the first portion of the audio track comprises comparing each of the one or more audio properties with a corresponding audio metric associated with the audio category.

15. The system of any of clauses 11-14, wherein selecting the first portion of the audio track comprises determining whether an aggregate difference between each of the one or more audio properties and a corresponding audio metric associated with the audio category is below a threshold difference.

16. The system of any of clauses 11-15, wherein selecting the first portion of the audio track comprises comparing each of the one or more audio properties with a range for a corresponding audio metric associated with the audio category.

17. In some embodiments, one or more non-transitory computer readable media stores instructions that, when executed by one or more processors, cause the one or more processors to perform the steps of: determining one or more audio properties of an audio track; selecting, based on the one or more audio properties, a first portion of the audio track that is representative of an audio category; playing the first portion of the audio track for a user; and adjusting, based on input from the user, a personalization setting for the user when playing back the first portion of the audio track.

18. The one or more non-transitory computer readable media of clause 17, further comprising determining, prior to selecting the first portion of the audio track and based on the one or more audio properties, whether the audio track is representative of the audio category.

19. The one or more non-transitory computer readable media of clauses 17 or 18, further comprising: associating the personalization setting with the audio category; and saving the personalization setting.

20. The one or more non-transitory computer readable media of any of clauses 17-19, further comprising: receiving a selection of a second audio track for playback; determining a second audio category for the second audio track; loading a second personalization setting associated with the second audio category; generating a customized audio signal by modifying audio from the second audio track according to the second personalization setting; and playing back the customized audio signal to the user.

Any and all combinations of any of the claim elements recited in any of the claims and/or any elements described in this application, in any fashion, fall within the contemplated scope of the present invention and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for determining audio personalization settings for an audio category, the method comprising:
    selecting a first portion of an audio track that is representative of the audio category;
    creating an audio sample comprising:
        comparing the first portion to a tempo of the audio track, and
        lengthening or shortening a duration of the audio track from the first portion to generate a second portion of the audio track,
        wherein the second portion avoids a discontinuity in the tempo of the audio track between a first repetition and a second repetition of the second portion;
    playing the audio sample for a user; and
    adjusting, based on an input from the user while the audio sample is playing, a personalization setting for the user to be used to modify signal processing of audio when playing back audio from the audio category.

2. The computer-implemented method of claim 1, wherein the audio sample comprises two or more repetitions of the second portion of the audio track.

3. The computer-implemented method of claim 1, wherein selecting the first portion of the audio track comprises determining whether one or more audio properties of the first portion of the audio track are representative of audio properties of the audio category.

4. The computer-implemented method of claim 3, further comprising:
    in response to determining that at least one of the one or more audio properties for the first portion of the audio track are not representative of the audio category, suggesting a second audio track that is representative of the audio category.

5. The computer-implemented method of claim 3, wherein the one or more audio properties further comprise at least one of bass levels, treble levels, frequency spectra, energy, or tempo.

6. The computer-implemented method of claim 3, wherein determining whether the one or more audio properties of the first portion of the audio track are representative of the audio properties of the audio category comprises determining whether a first audio property of the first portion of the audio track is within a defined range for a corresponding audio metric associated with the audio category.

7. The computer-implemented method of claim 1, wherein selecting the first portion of the audio track comprises comparing each of one or more audio properties of the first portion with a corresponding audio metric associated with the audio category.

8. The computer-implemented method of claim 1, wherein selecting the first portion of the audio track comprises determining whether an aggregate difference between each of one or more audio properties of the first portion of the audio track and corresponding audio metrics for the audio category is below a threshold difference.

9. The computer-implemented method of claim 1, further comprising storing the personalization setting as a personalization setting for the user to be used when playing back audio tracks from the audio category, wherein the personalization setting includes at least one of:
   a dynamic range compression of an input audio signal,
   a dynamic expansion of the input audio signal,
   an audio limiting of the input audio signal, or
   a spatial processing of the input audio signal.

10. The computer-implemented method of claim 1, further comprising determining the audio category for the audio track based on metadata associated with the audio track or a user selection.

11. The computer-implemented method of claim 1, further comprising:
   receiving a selection of a second audio track;
   determining a first audio category for the second audio track;
   loading a first personalization setting associated with the first audio category and the user; and
   applying the first personalization setting to the second audio track during playback of the second audio track.

12. The computer-implemented method of claim 11, further comprising determining the first audio category based on metadata associated with the second audio track or a user selection of the first audio category.

13. One or more non-transitory computer readable media storing instructions that, when executed by one or more processors, cause the one or more processors to perform the steps of:
   selecting a first portion of an audio track that is representative of an audio category;
   creating an audio sample comprising:
      comparing the first portion to a tempo of the audio track, and
      lengthening or shortening a duration of the audio track from the first portion to generate a second portion of the audio track,
      wherein the second portion avoids a discontinuity in the tempo of the audio track between a first repetition and a second repetition of the second portion;
   playing the audio sample for a user; and
   adjusting, based on an input from the user while the audio sample is playing, a personalization setting for the user to be used to modify signal processing of audio when playing back audio from the audio category.

14. The one or more non-transitory computer readable media of claim 13, wherein the audio sample comprises two or more repetitions of the second portion of the audio track.

15. The one or more non-transitory computer readable media of claim 13, wherein selecting the first portion of the audio track comprises determining whether one or more audio properties of the first portion of the audio track are representative of audio properties of the audio category.

16. The one or more non-transitory computer readable media of claim 15, wherein the steps further comprise:
   in response to determining that at least one of the one or more audio properties for the first portion of the audio track are not representative of the audio category, suggesting a second audio track that is representative of the audio category.

17. The one or more non-transitory computer readable media of claim 15, wherein the one or more audio properties further comprise at least one of bass levels, treble levels, frequency spectra, energy, or tempo.

18. The one or more non-transitory computer readable media of claim 15, wherein determining whether the one or more audio properties of the first portion of the audio track are representative of the audio properties of the audio category comprises determining whether a first audio property of the first portion of the audio track is within a defined range for a corresponding audio metric associated with the audio category.

19. A system, comprising:
   a memory storing one or more software applications; and
   a processor that, when executing the one or more software applications, is configured to perform steps of:
      selecting a first portion of an audio track that is representative of an audio category;
      creating an audio sample comprising:
         comparing the first portion to a tempo of the audio track, and
         lengthening or shortening a duration of the audio track from the first portion to generate a second portion of the audio track,
         wherein the second portion avoids a discontinuity in the tempo of the audio track between a first repetition and a second repetition of the second portion;
      playing the audio sample for a user; and
      adjusting, based on an input from the user while the audio sample is playing, a personalization setting for the user to be used to modify signal processing of audio when playing back audio from the audio category.

* * * * *